G. STRICKER.
Vehicle-Spring.
No. 203,212. Patented April 30, 1878.
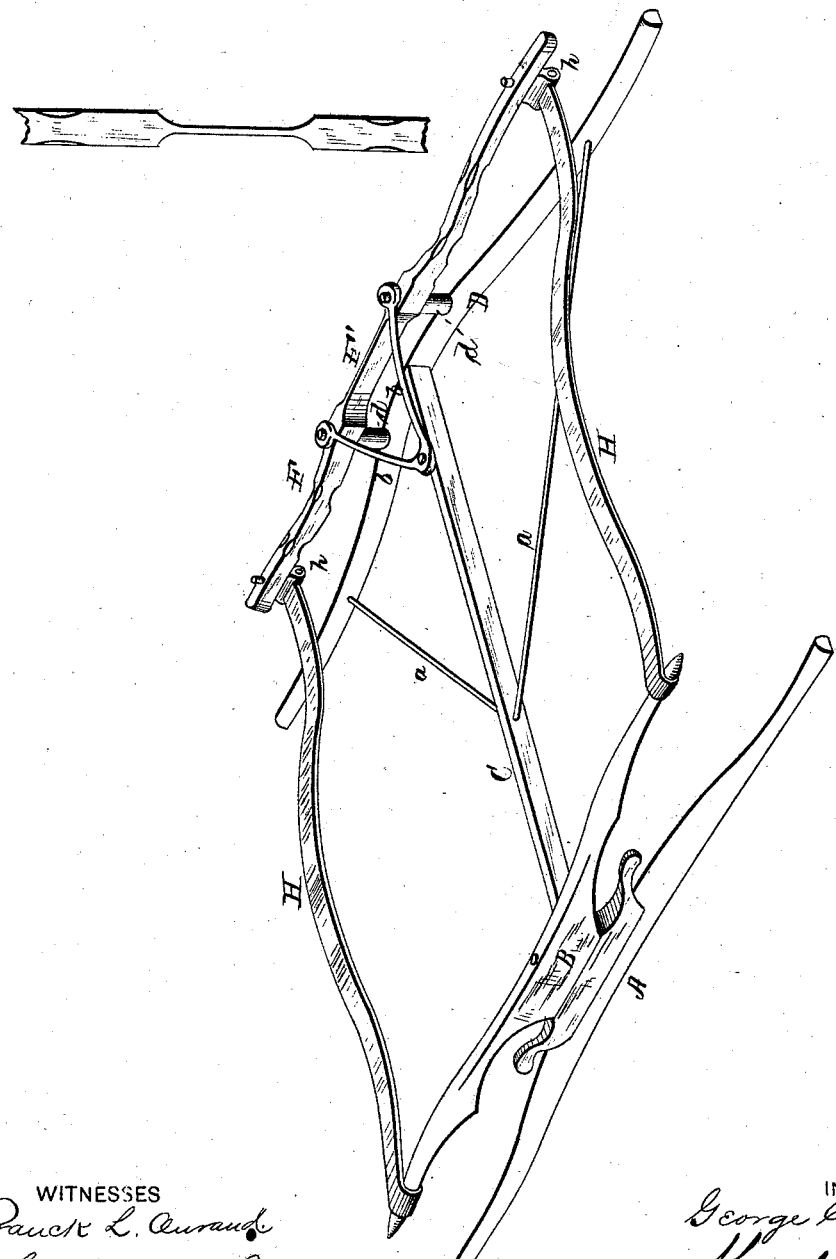
WITNESSES
INVENTOR
ATTORNEYS

UNITED STATES PATENT OFFICE.

GEORGE STRICKER, OF CATAWISSA, PENNSYLVANIA.

IMPROVEMENT IN VEHICLE-SPRINGS.

Specification forming part of Letters Patent No. 203,212, dated April 30, 1878; application filed February 26, 1878.

*To all whom it may concern:*

Be it known that I, GEORGE STRICKER, of Catawissa, in the county of Columbia, and in the State of Pennsylvania, have invented certain new and useful Improvements in Vehicle-Springs; and do hereby declare that the following is a full, clear, and exact description thereof, reference being had to the accompanying drawing, and to the letters of reference marked thereon, making a part of this specification.

My invention relates to side-spring vehicles; and it consists in the construction of a spring-bar, to which the ends of the side springs are connected, and in the combination of parts, as will be hereinafter more fully set forth.

In order to enable others skilled in the art to which my invention appertains to make and use the same, I will now proceed to describe its construction and operation, referring to the annexed drawing, which represents a perspective view of my invention.

A represents the front axle of a vehicle, with head-block B, said head-block being connected, by a perch, C, with the hind axle D. On the hind axle D, at equal distances from the center, are two short posts or studs, $d\ d$, upon which is placed the spring-bar F.

$a\ a$ are braces connecting the perch and rear axle, and $b\ b$ are braces connecting the upper ends of the studs or posts $d\ d$ with the perch.

The center of the spring-bar F between the two studs or posts is reduced in thickness, so as to form a spring, F', while the ends from each stud outward are rigid, and pivoted on the studs.

H H represent the side springs, the front ends of which are wrapped around or otherwise connected to the ends of the head-block B. The rear ends of the side springs are hung in clips $h\ h$ under the ends of the spring-bar F.

It will readily be seen that when either one of the side springs H is pressed down that end of the spring-bar is pressed outward, and turns on its stud, bending that portion of the center part or spring F' inward, which action causes the other end of the spring-bar to move or turn outward in an exactly corresponding ratio with that of the first end, and the other side spring be drawn down exactly as much as the first one was pressed down. By this means, therefore, an exact equalizer is obtained, keeping the body of the vehicle in proper position at all times.

Though I have described the spring-bar F as being applied to the rear axle, it is evident that it may equally as well be applied to the sand-board or head-block over the front axle, or on both, if so desired.

Having thus fully described my invention, what I claim as new, and desire to secure by Letters Patent, is—

1. The spring-bar F, having its center portion reduced to form the spring F', and pivoted upon two studs or posts, $d\ d$, substantially as and for the purposes herein set forth.

2. In a side-spring vehicle, the combination of the side springs H H, clips $h\ h$, spring-bar F, having its center portion reduced to form the center spring F', and the stationary posts or studs $d\ d$, substantially as and for the purposes herein set forth.

In testimony that I claim the foregoing I have hereunto set my hand and seal this 28th day of January, 1878.

GEORGE STRICKER. [L. S.]

Witnesses:
 M. G. HUGHES,
 J. B. KNITTLE.